F. HANBA & R. GLADFELTER.
AUTOMOBILE DOOR HINGE.
APPLICATION FILED MAR. 29, 1913.

1,078,786.

Patented Nov. 18, 1913.

2 SHEETS—SHEET 1.

Witnesses
Chas. W. Stauffiger
Joseph A. Noelke

Inventors
Frank Hanba,
Robert Gladfelter,
By
Attorneys

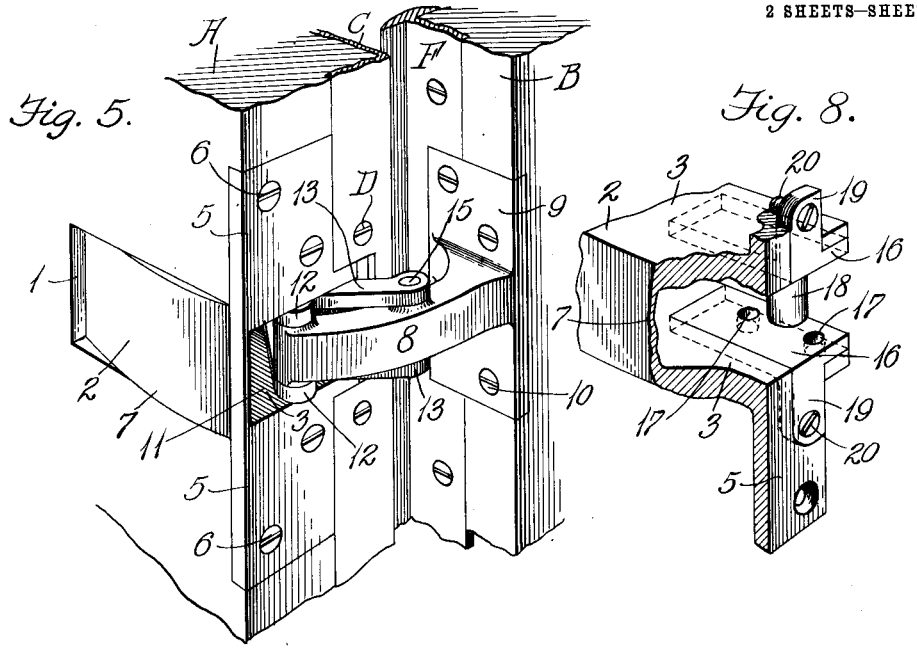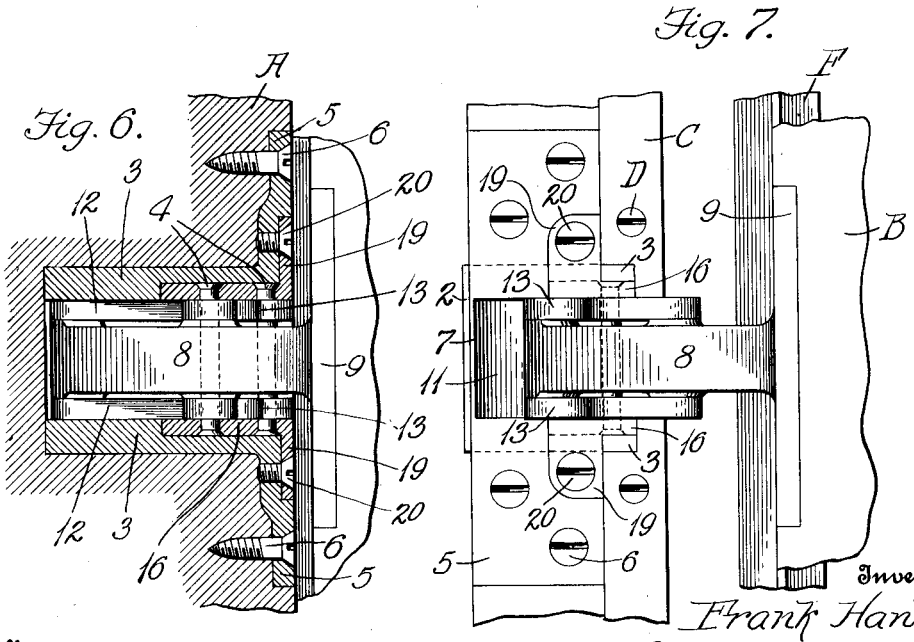

UNITED STATES PATENT OFFICE.

FRANK HANBA AND ROBERT GLADFELTER, OF DETROIT, MICHIGAN.

AUTOMOBILE DOOR-HINGE.

1,078,786.  Specification of Letters Patent.  Patented Nov. 18, 1913.

Application filed March 29, 1913. Serial No. 757,505.

*To all whom it may concern:*

Be it known that we, FRANK HANBA, a subject of the Emperor of Austria-Hungary, and ROBERT GLADFELTER, a citizen of the United States of America, both residing at Detroit, in the county of Wayne and State of Michigan, have invented certain new and useful Improvements in Automobile Door-Hinges, of which the following is a specification, reference being had therein to the accompanying drawings.

This invention relates to improvements in concealed hinges and more particularly to a hinge especially adapted for the doors of automobile bodies and the like.

The object of the invention is to provide a very simple construction in which the door is rigidly supported and accurately guided and which is such as to provide a very simple construction which is cheap to manufacture and not liable to get out of order or be broken.

To these ends the invention consists in the matters hereinafter set forth, and more particularly pointed out in the claims, reference being had to the accompanying drawings in which—

Figure 1:
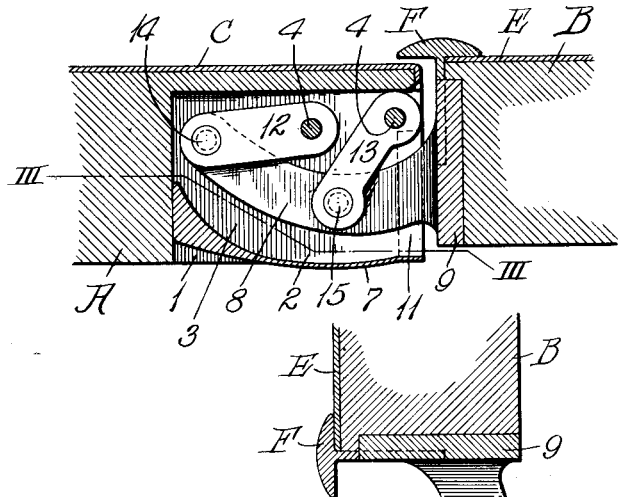
Figure 2:
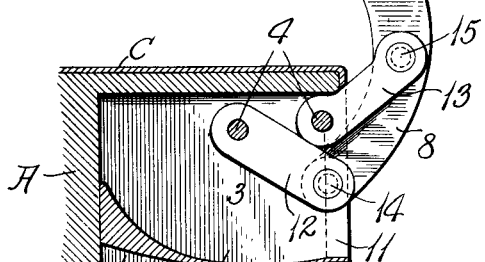
Figure 3:
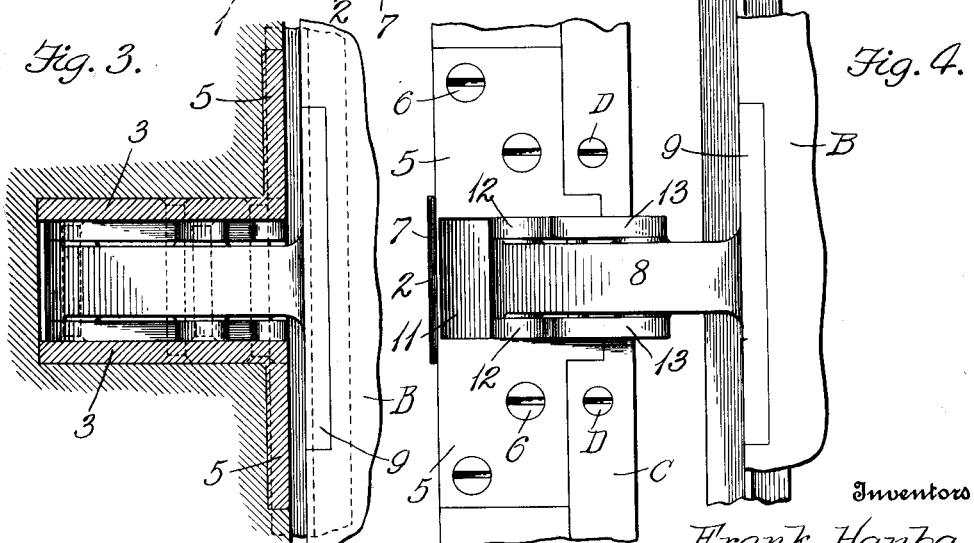
Figure 4:
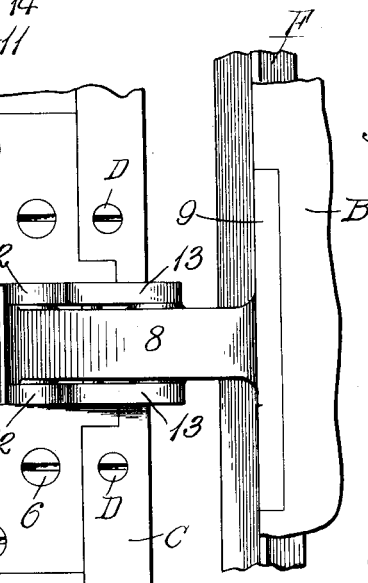

Figure 1 is a horizontal section through a hinge embodying the invention showing the door in closed position; Fig. 2 is a similar view showing the door in open position; Fig. 3 is a vertical section on the line III—III of Fig. 1; Fig. 4 is an elevation of Fig. 2 looking at the edge of the door casing; Fig. 5 is a perspective view of the hinge in operative position with the door open; Fig. 6 is a sectional view similar to Fig. 3 and showing a modified construction; Fig. 7 is a view similar to Fig. 4 showing the modified construction, and Fig. 8 is a perspective detail of a part of the hinge construction shown in Figs. 6 and 7.

In the drawings, A represents a portion of the door frame or body frame of a metal vehicle body, and B indicates a portion of the frame of an automobile body door. Following the usual construction of automobile bodies, the frame A is covered upon the exterior with sheet metal C forming the outer surface of the body and this metal is bent inward along the outer edge of the frame A and secured in place in any suitable manner as by screws D or the like. In like manner the door frame B is covered on its exterior by sheet metal E and the edge of the door is protected by a metal finishing strip F which also serves to cover the joint between the edge of the door and the edge of the body frame.

The frame A is formed with a mortise 1 to receive a cast metal casing 2 which forms one member of the hinge. This casing has upper and lower sides 3 provided with openings to receive pivot pins or pintles 4 of the hinge. The casing is also formed with upwardly and downwardly extending flanges 5 on the ends of the sides 3 which flanges are let into the frame A to bring their outer faces flush with the face of the frame and the casing is firmly secured in place within the mortise by means of screws 6 passing through openings in these flanges and engaging the body frame. The casing is closed at the inner side of the frame A by a curved wall 7 connecting the sides 3.

The member of the hinge which is secured to the door comprises a curved arm 8 provided with a flanged base 9 having openings to receive screws 10 for securing the arm firmly to the edge of the door frame B, said base plate 9 being let into the frame with its outer face flush with the edge face of the frame. The arm 8 is adapted to project into the open end 11 of the casing 2 and is supported and guided to swing into and out of said casing when the door is open or closed, by means of two pairs of links, each pair comprising a link 12 and a link 13 and the pairs of links being arranged with one pair at the upper side of the arm and the other pair at the lower side thereof. These links are pivotally secured at one end within the casing 2 upon the pintles 4 and the two links 12 are pivotally attached by a pivot pin 14 to the extreme end of the arm 8. The links 13 are pivotally connected to the arm 8 intermediate the ends of said arm by means of a pivot pin 15. The combined thickness of the arm 8 and the links at each side thereof is such that they fit closely within the casing between the upper and lower sides 3 thereof and thus the casing forms a rigid guide for the links and prevents the door from sagging when in open position. The links are in such a position and are so connected to the arm 8 that when the door is opened the arm will be swung longitudinally of the casing and outwardly from the outer side of the door casing, the arm, when the door is fully open, extending directly outward from the side of the body and being supported entirely by the links, the links 13 being arranged to swing out through the end of the casing with the arm and the links 12 arranged to guide the inner end of the arm in its movement from the inner end of the casing to the outer end thereof.

When the door is in open position, as shown in Fig. 2, the links 13 extend just far enough into the casing to have a firm bearing upon the walls 3 thereof so that they form a rigid support and guide for the arm 8 which is projected thereby outwardly and supports the door with its edge at a distance from the outer side of the body. This permits of securing the usual finishing strips (not shown) to the outer face of the body as the finishing strip F on the edge of the door is thus moved with the door outwardly from the outer face of the body.

In the construction shown in Figs. 6, 7 and 8, the pintles 4 are carried by suitable plates 16 which are provided with openings 17 for the ends of the pintles and are set within recesses provided to receive them within the upper and lower sides 3 of the casing 2. These plates 16 are connected by means of a cross-bar 18 so that they will be properly alined with each other to hold the pintles in position, and upwardly and downwardly extending lugs 19 on the ends of the blades engage recesses in the flanges 5 of the casing and form means for securing the blades in place. Screws 20 pass through openings in the lugs 19 and into screw-threaded openings in the flanges 5 to detachably secure the plates in place. With this construction, should one of the pintles or lugs become worn or broken so that it is necessary that it be replaced or repaired, these parts may be quickly and easily detached without liability of marring the painting or finishing of the door frame, by simply removing the two screws 20 and pulling the plates out of the casing. In this construction a very cheap and efficient concealed hinge is secured and the door is guided outwardly thereby when open, so that the usual finishing strips may be applied both to the door and body or door casing. All sagging or rattle of the door in use is prevented by the particular manner in which the arms 8 are guided and accurately held within the casings 2 which are concealed within the door casing.

Having thus fully described our invention what we claim is:—

1. In a hinge, the combination of a casing having upper and lower sides and adapted to be secured to a door casing, an arm rigidly secured to a door to swing into and out of said casing, a link pivoted at one end to the casing intermediate its ends to swing therein and pivotally attached at its opposite end to the inner end of the arm, a link pivoted at one end to the casing adjacent to the open end thereof to swing outwardly through said end and pivoted at its opposite end to the arm intermediate the ends of said arm, said arm and links fitting within the casing between the upper and lower sides thereof and said links forming the sole pivotal connection between said arm and casing.

2. In a hinge the combination of a hinge casing adapted to be secured within a mortise in a frame of a door casing, a curved arm rigidly secured to a door and projecting into said hinge casing when the door is in closed position, links pivotally attached at one end to the free end of said arm at the upper and lower sides thereof and pivotally secured at their opposite ends within the hinge casing, links pivotally attached at one end to the upper and lower sides of the arm intermediate the ends of said arm and pivotally secured within the hinge casing at their opposite ends, said links being adapted to swing within the hinge casing in contact with the upper and lower walls of said casing.

3. In a hinge, the combination with a door, and a casing, of a curved arm having one end thereof rigidly connected to said door, a link pivotally mounted in said casing and pivotally connected to the outer end of said arm, and means pivotally mounted in said casing and connected to said arm intermediate the ends thereof to cause the door end of said arm to swing in an arc to and from said casing.

In testimony whereof we affix our signatures in presence of two witnesses.

FRANK HANBA.
ROBERT GLADFELTER.

Witnesses:
LEWIS E. FLANDERS,
ANNA M. DORR.